United States Patent [19]

Gray et al.

[11] 3,985,667

[45] Oct. 12, 1976

[54] PROCESS AND COMPOSITION FOR DRILLING SHALE FORMATION IN SEA WATER

[75] Inventors: Kenneth Russell Gray; Lloyd Eugene Van Blaricom; Harvey Rudolph Deweyert, all of Shelton, Wash.

[73] Assignee: International Telephone and Telegraph Corporation, New York, N.Y.

[22] Filed: Oct. 10, 1973

[21] Appl. No.: 405,155

[52] U.S. Cl. ............................. 252/8.5 A; 175/65; 252/8.5 C; 260/124 R
[51] Int. Cl.² ............................................ C09K 7/02
[58] Field of Search ................ 252/8.5 A, 8.5 C; 175/65

[56] References Cited
UNITED STATES PATENTS

| | | | |
|---|---|---|---|
| 3,007,864 | 11/1961 | Adolphson et al. | 252/8.5 |
| 3,009,874 | 11/1961 | Chisholm | 252/8.5 |
| 3,017,351 | 1/1962 | Scott et al. | 252/8.5 |
| 3,171,810 | 3/1965 | King et al. | 252/8.5 |
| 3,278,425 | 10/1966 | King et al. | 252/8.5 |
| 3,318,396 | 5/1967 | Tailleur | 175/72 |
| 3,505,243 | 4/1970 | Steinberg et al. | 252/8.5 |

OTHER PUBLICATIONS

O'Brien, Using Sea Water for Drilling Mud, Article in World Oil, May 1955, pp. 134, 138, 140, 144 and 146.

*Primary Examiner*—Herbert B. Guynn
*Attorney, Agent, or Firm*—J. B. Raden; H. J. Holt

[57] ABSTRACT

A process and composition for drilling a well through shale formation in sea water with an aqueous drilling mud comprising a clay — sea water slurry containing a potassium salt of lignosulfonate. The lignosulfonate is prepared by reaction of potassium hydroxide or a salt of sulfurous acid with spent sulfite liquor at elevated temperatures. A particularly effective drilling composition also contains hydroxy acids and up to 4%, based on total solids content of the lignosulfonate, of an iron complex.

2 Claims, No Drawings

PROCESS AND COMPOSITION FOR DRILLING SHALE FORMATION IN SEA WATER

This invention relates to a process for drilling shale formations in sea water and to an aqueous drilling mud and composition for use in drilling such shale formations.

A number of problems are encountered in the drilling of wells in shale formations in sea water, particularly of the type found in the North Sea area. Penetration of the soft, sticky "gumbo" shales is costly because of time lost as a result of balled bottom hole assemblies, plugged flow lines and clogged shaker screens. Moreover, high mud weights are required to control formation pressures and maintain borehole stability. The water dilution required to control viscosity in the high density muds results in increased mud costs because of additional barite consumption. These problems are particularly severe in the North Sea where the shale extends as deep as 6,000 feet.

A number of dispersants for oil and gas well drilling muds are known. Among these are the reaction products of spent sulfite liquor and the salts of sulfurous acid as described in U.S. Pat. No. 3,505,243, assigned to the present assignee. U.S. Pat. No. 3,007,864 discloses a drilling mud additive of the reaction product of alkali metal hydroxides or salts and spent sulfite liquor. However, these and other known additives to drilling fluids are disclosed as, and intended to act as, dispersants to control the rheological properties of the muds. In the drilling of shale formations, dispersion is an important requirement of any additive but of even greater importance is the ability of the additive to control the swelling characteristics of the shale. The latter function has not been suggested for the foregoing drilling mud dispersants.

It is also known that potassium compounds, such as KCl, caustic potash, potassium carbonate, potassium soaps of sulfurized fatty acids minimize borehole enlargement when used with drilling muds as disclosed in U.S. Pat. No. 3,318,396. However, while these potassium compounds may provide swelling inhibition, they do so without dispersion and are therefore not satisfactory alone. Moreover, magnesium and calcium salts in sea water form precipitates with the potassium soap and carbonate compounds and thus they would not be useful in sea water drilling.

It is accordingly an object of the present invention to provide a process for shale formation drilling in sea water which effectively acts as both a swelling inhibitor and a dispersant.

It is an additional object of this invention to provide a drilling mud composition for drilling through shale formation in sea water which is effective, simple to prepare and economical to use.

It is still an additional object of the invention to provide a drilling composition which is effective not only for shale formations, but which in addition is also useful for other well drilling applications.

It has now been found that drilling through such shale formations may be successfully accomplished by circulating through the well an aqueous drilling mud composition comprising a clay — sea water slurry containing a potassium salt of lignosulfonate, the lignosulfonate being prepared by reaction of postassium hydroxide or a salt of sulfurous acid with soluble base spent sulfite liquors at elevated temperatures. The resulting lignosulfonate salts have been found to act both as dispersants as well as swelling inhibitors. Moreover, they form little or no insoluble precipitates in sea water.

Certain of the potassium salts of lignosulfonates useful in the invention are believed to be new products while others have been previously disclosed. However, none of the salts have ever, in so far as is known, been suggested for use in, or used in, sea water shale formation drilling. Nor have their combined swelling inhibition and dispersion properties been previously recognized.

A particularly effective product within the scope of the invention which is believed to represent a new composition of matter and which is simple and economical to prepare comprises a mixture of lignosulfonate salts and hydroxy acid salts. This product is prepared by reacting soluble base spent sulfite liquor and from 5% to 25%, based on the solids content of the spent sulfite liquor, of potassium hydroxide, the reaction being carried out at a temperature of from 50° to 175° C to produce a reaction product having a final pH of no less than 10. In practice the reaction is carried out for from 15 minutes to 2 hours — the shorter times being used with the higher temperature and vice versa. The reaction may be carried out under pressure in an autoclave or may be carried out under atmospheric conditions. In the latter case, the proportion of KOH should be adjusted to provide a final pH of at least 11. The final pH should be no less than 10 when the reaction is carried out under pressure in an autoclave.

The potassium salt of lignosulfonate may also be prepared by reacting either the sodium or potassium salt of sulfurous acid with soluble base spent sulfite liquor at a temperature of from 80° to 200° C, the sulfurous acid salt being used in an amount equivalent to from 2% to 4% of $SO_2$ based on the solids content of the spent sulfite liquor. If the potassium salt of sulfurous acid is used, it requires no further treatment for use as a drilling mud additive in accordance with the invention. If the sodium salt of sulfurous acid is used, the sodium ions of the sodium lignosulfonate are replaced with potassium ions, as for example with an ion exchange resin. The preparation of sodium and potassium lignosulfonate by reaction with a sodium or potassium salt of sulfurous acid is disclosed more fully in Steinberg and Gray U.S. Pat. No. 3,505,243, assigned to the present assignee, the disclosure of which is hereby incorporated by reference.

This term soluble-base spent sulfite liquor (SSL) as used herein refers to spent sulfite liquor derived from the pulping of wood with a solution containing sulfurous acid and sodium or ammonium bisulfite. Such spent sulfite liquors have a relatively low pH (e.g. 1.5 to 4.0) and the lignin contained therein is considered to be in the form of lignosulfonic acids and lignosulfonic acid salts of the soluble-base. Such liquors also contain large quantities of reducing sugars, predominantly mannose and glucose, derived through hydrolysis of the carbohydrate fraction of the wood by the acidic cooking liquor. The term soluble-base spent sulfite liquor also refers to spent sulfite liquors which were originally obtained by the acid-sulfite pulping of wood with sulfurous acid-bisulfite solutions of insoluble bases but which were subsequently converted to soluble base. Examples of such liquors include ammonia and sodium-base spent sulfite liquors prepared from calcium-base spent sulfite liquor by (1) treatment with ammonium or sodium sulfate or sulfite under pH conditions such that the calcium is substantially precipitated, or (2) cation exchange. Sodium base SSL contain, on a solid basis, about 65% by weight sodium lignosulfonate and about 28% of reducing sugars. In the case of ammonium base SSL, the amount of reducing sugar is about 5% less or about 20% to 23%.

In the case of the KOH digestion product, the reaction product, if the starting SSL is a soda base liquor, is largely an equilibrium mixture of the potassium and sodium salts of lignosulfonate and of the hydroxy acid conversion products of the sugars present in SSL. In the case of an ammonium base SSL, the reaction product of the KOH digestion contains only the potassium salts. The improved results of the invention are dependent on the presence of the potassium salts and accordingly reference hereinafter will be made to the potassium salts of the foregoing materials. Such reference is intended to include equilibrium mixtures of potassium and sodium salts.

The presence of the hydroxy acid salts in the KOH digestion products, normally from 5 to 15% based on solids content, has been found to form highly stable metal complexes with iron which render the products even more effective in drilling applications. Specifically, the addition of a ferric salt, such as ferric sulfate, nitrate or chloride, to the KOH digestion product, forms a ferric complex with the hydroxy acids which improves the dispersion capability of the products. The ferric salt is added in amounts which provides from ½% to 4% of the ferric complex in the final product, based on total solids. The ferric salt may be added at room temperature or heated to aid dissolution. The complex forms essentially instantaneously upon dissolving in the salt mixture.

The reaction conditions for the preparation of the potassium salts of the lignosulfonates will vary with the particular product being prepared. In general, the reactions may be carried out either under atmospheric conditions or under pressure in an autoclave. Reaction temperatures may range from 50° to 200° C, normally 50° to 175° C for the KOH digestion product. Digestion times will vary from 15 minutes to 2 hours. In the case of the KOH digestion product, the amounts of KOH may vary from 5% to 25%, usually 10% to 25%, based on the solids content of the SSL and the final pH will be greater than 10, normally between 10 and 11.5. Generally, the SSL is concentrated prior to reaction to a total solids content of from 30% to 55%, preferably 45% to 55%.

The following examples illustrate the preparation of potassium salts of lignosulfonates in accordance with the practice of the invention. For comparative purposes, samples were also prepared of the corresponding sodium salts of lignosulfonates. In addition, soda base SSL was also neutralized with, rather than digested at elevated temperatures with, potassium hydroxide to compare the resulting product with that of the present invention. Unless otherwise indicated, all parts are by weight.

EXAMPLE 1

Soda base spent sulfite liquor, derived from the pulping of western hemlock wood chips with a solution of sodium bisulfite and sulfurous acid, was concentrated by evaporation to about 52% total solids and digested at atmospheric pressure with 20% KOH (0.20 KOH:SSL solids) at about 82° C for about 30 minutes. The initial pH of the mixture was 12.9, the final pH was 11.5. The product was diluted to about 50% total solids solution.

A portion of this solution was spray dried using 316° C inlet air. This product, primarily a mixture of potassium — sodium lignosulfonate and hydroxy acid salts has the following typical analysis.

| | |
|---|---|
| sodium | 2.9% |
| potassium | 10.0% |
| total sulfur | 5.8% |
| sulfite sulfur (as S) | 0.17% |
| sulfate sulfur (as S) | 0.4% |
| total sugars | 1.2% |
| lactonizable hydroxy acids | 11.4% |

EXAMPLE 2

Iron complexes of the potassium-sodium lignosulfonate of Example 1 were prepared by adding ferric sulfate to give a 2% iron complex on final product to the digested liquor at about 65° C for about 10 minutes.

EXAMPLE 3

For control purposes concentrated soda base spent sulfite liquor was digested with NaOH. Concentrated sode base spent sulfite liquor at about 50% total solids was digested with NaOH (0.1425 NaOH:SSL solids) at 82° C for about 30 minutes. A portion of the digested liquor was spray dried using 316° C inlet air. A typical analysis of this product is as follows:

| | |
|---|---|
| sodium | 9.1% |
| potassium | 0.17% |
| total sulfur | 4.4% |
| sulfite sulfur (as S) | 0.36% |
| sulfate sulfur (as S) | 0.54% |
| total sugars | trace |

The hydroxy acid content was approximately 11%.

EXAMPLE 4

Iron complexes of the sodium lignosulfonate product of Example 3 were prepared by adding ferric sulfate to give 2% iron on final product to the digested liquor at about 65° C and retaining at 65° C for about 30 minutes.

In the following Examples 5 through 8, additional control samples were prepared by neutralizing soda base spent sulfite liquor with NaOH or KOH and then adding an iron salt to portions of the neutralized samples.

EXAMPLE 5

The pH of concentrated soda base spent sulfite liquor at about 52% total solids was adjusted from pH 2.7 to pH 8.0 with 90% KOH. A portion of this neutralized liquor was spray dried using 316° C inlet air. This product contained 2.4% hydroxy acids.

EXAMPLE 6

Iron complexes of soda base SSL neutralized with KOH were prepared by adding ferric sulfate to give a 2% iron content in final product to the neutralized liquor of Example 5. The ferric salt was added to the liquor at about 65° C and retained at 65° C for about 30 minutes.

EXAMPle 7

Concentrated soda base spent sulfite liquor at about 52% total solids was adjusted from pH 2.7 to pH 8.0 with 50.8% NaOH. A portion of this neutralized liquor was spray dried using 316° C inlet air.

EXAMPLE 8

Iron complexes of soda base SSL neutralized with NaOH were prepared by adding ferric sulfate to give 2% iron on final product to the neutralized liquor at about 65° C and retaining at 65° C for about 30 minutes.

EXAMPLE 9

Concentrated sodium base spent sulfite liquor at about 52% total solids was digested in an autoclave with KOH (0.20 KOH:SSL solids) at about 165° C for about 30 minutes. The initial pH was 12.9, the final pH was 10.0. A portion of this solution was spray dried using 316° C inlet air. A typical analysis of this product is as follows:

| | |
|---|---|
| sodium | 4.4% |
| potassium | 9.4% |
| total sulfur | 4.5% |
| sulfite sulfur (as S) | 0.29% |
| sulfate sulfur (as S) | 0.65% |
| total sugars | trace |
| lactonizable hydroxy acids | 7.1% |

EXAMPLE 10

Iron complexes of the K-Na lignosulfonate of Example 9 were prepared by adding ferric sulfate to give 2% iron on final product, to the digested liquor at about 65° C and retaining at 65° C for about 30 minute.

EXAMPLE 11

Concentrated ammonium base spent sulfite liquor from the pulping of hemlock wood with a solution of ammonium bisulfite and sulfurous acid, at about 50% total solids was digested with KOH (0.20 KOH:SSL solids) at about 165° C for 30 minutes. The initial pH was 12.9, the final pH was 10.0. A portion of the digested liquor was spray dried using 316° C inlet air. A typical analysis of this product is as follows:

| | |
|---|---|
| sodium | 0.55% |
| potassium | 9.1% |
| total sulfur | 4.4% |
| sulfite sulfur (as S) | 0.10% |
| sulfate sulfur (as S) | 0.68% |
| total sugars | trace |
| lactonizable hydroxy acid | 7.4% |

EXAMPLE 12

Concentrated ammonium base spent sulfite liquor at about 46% total solids was digested with KOH (0.20 KOH:SSL solids) at 82° C for 30 minutes. The initial pH was 12.9, the final pH was 11.5. A portion of the digested liquor was spray dried using 316° C inlet air. A typical analysis of this product is as follows:

| | |
|---|---|
| sodium | 0.55% |
| potassium | 9.6% |
| total sulfur | 4.9% |
| sulfite sulfur (as S) | 0.14% |
| sulfate sulfur (as S) | 0.81% |
| total sugars | trace |

The hydroxy acid content was between 7½% and 11%.

EXAMPLE 13

Iron complexes of the K-lignosulfonate of Example 12 were prepared by adding ferric sulfate to give 2% iron on final product to the digested liquor at about 65° C and retaining at that temperature for about 30 minutes.

Additional control samples were prepared by digestion of ammonium base spent sulfite liquor with sodium hydroxide as set forth in the following Examples 14 and 15.

EXAMPLE 14

Concentrated ammonium base spent sulfite liquor at about 46% total solids was digested with sodium hydroxide (0.1425 NaHO:SSL solids) at 82° C for 30 minutes. A portion of the digested liquor was spray dried using 316° C inlet air. A typical analysis of this product is as follows:

| | |
|---|---|
| sodium | 3.8% |
| potassium | 0.12% |
| total sulfur | 5.0% |
| sulfite sulfur (as S) | 0.13% |
| sulfate sulfur (as S) | 0.82% |
| total sugars | trace |

The hydroxy acid content was about 7.4%.

EXAMPLE 15

Iron complexes of the Na-lignosulfonate of Example 14 were prepared by adding ferric sulfate to give 2% iron on final product to the digested liquor at about 65° C and retaining at that temperature for about 30 minutes.

EXAMPLE 16

A sample of potassium lignosulfonate was prepared by treating sodium lignosulfonate (prepared according to Example 1 of U.S. Pat. No. 3,505,243) with a sulfonated polystyrene cation exchange resin in the hydrogen form to a pH of 0.9. The ion-exchange resin was removed on a fine screen, the liquor adjusted to pH 8.0 with KOH solution and then dried in a 60° C oven.

EXAMPLE 17

A sample of sodium lignosulfonate (prepared according to Example 1 of U.S. Pat. No. 3,505,243) was neutralized to a pH 8.0 with a NaOH solution and then dried in a 60° C oven.

The final pH of the reaction of SSL with KOH will, as previously indicated, be no less than 10, usually from 10 to 11.5. The following Table I sets forth the range of the initial and final pH's with varying proportions of KOH and times and temperatures of reaction. Initial pH is at start of digestion; final pH is at completion of digestion.

Table I

| KOH:SSL Solids | Max Temp °C | Time at Max Temp., min. | pH Initial | pH Final |
|---|---|---|---|---|
| 0.10 | 50 | 30 | 11.1 | 10.6 |
| 0.15 | 95 | 30 | 11.9 | 10.1 |
| 0.20 | 165 | 30 | 12.9 | 10.0 |
| 0.25 | 165 | 45 | 13.8 | 11.0 |
| 0.20 | 165 | 15 | 12.9 | 10.1 |
| 0.20 | 82 (180°F) | 30 | (12.9) | 11.5 |

EXAMPLE 18

Concentrated soda base spent sulfite liquor at about 50% total solids was diluted to about 40% total solids and digested with $K_2SO_3$ (0.10$SO_2$:SSL solids) at 165° C for 30 minutes. A portion of this liquor was spray dried using 316° C inlet air.

EXAMPLE 19

An iron complex of the lignosulfonate of Example 18 was prepared by adding ferric sulfate to give 2% iron on final product to the digested liquor at 65° C and retaining at 65° C for 30 minutes. The product was then spray dried using 316° C inlet air.

EXAMPLE 20

Concentrated soda base spent sulfite liquor at about 52% total solids was diluted to about 40% total solids and digested with $K_2S_2O_5$ and $K_2SO_3$ (.07$SO_2$:SSL solids — 75% as $K_2S_2O_5$ and 25% as $K_2SO_3$) at 165° C for 30 minutes. A portion of this liquor was spray dried using 316° C inlet air.

EXAMPLE 21

An iron complex of the lignosulfonate of Example 20 was prepared by adding ferric sulfate (to give 2% iron on final product) to the digested liquor at 65° C and retaining at 65° C for 30 minutes. The product was then spray dried using 316° C inlet air.

EXAMPLE 22

Concentrated soda base spent sulfite liquor at about 50% total solids was digested with KOH solution (0.1425 KOH:SSL solids) at 50° C for 45 minutes, then at 95° C for 30 minutes. A portion was spray dried using 316° C inlet air.

EXAMPLE 23

An iron complex of the lignosulfonate of Example 22 was prepared by adding ferric sulfate (to give 3% iron in the final product) to the digested liquor at 65° C and retaining at 65° C for 30 minutes. The product was then spray dried using 316° C inlet air.

The potassium lignosulfonates of the invention are normally used by adding them, in dry powdered form to the sea water-shale slurry or mud circulated through the well as it is drilled. It is added in amounts of about 6 lbs./barrel of mud (1½% by weight) although this amount may vary considerably, from as little as 0.5 lbs./barrel to as much as 20 lbs./barrel depending on other additives present, the type of shale encountered and the drilling conditions. Caustic soda may also be added to adjust the pH of the mud to from 8 to 9½. Other additives, such as a barium sulfate weighting material may also be added to the mud.

Two types of tests were conducted on the products prepared in accordance with the foregoing examples; Sea Water Dispersion Tests and Sea Water Inhibition Tests. These test results have been found to correlate closely with actual results of clay dispersion and swelling inhibition in sea water shale formations and are therefore believed a reliable measure of the properties of these products in such drilling.

The procedure for the sea water dispersion tests was as follows:

A sea water base mud was prepared by adding 1,800 grams of illite clay and 1,200 grams of sodium bentonite to 7 liters of Oakland Bay sea water. These ingredients were then mixed for one hour to hydrate the clays and the base mud was then aged overnight at room temperature before use.

This base mud was treated with 6 lbs./barrel of the samples and pH was adjusted to 10.0 during a 10 minute mix. The samples were then aged for 16 hours at 158° F, cooled to room temperature, remixed for 5 minutes and evaluated using standard mud procedures.

The procedure for the sea water inhibition tests was as follows:

A 2% solution of the samples was prepared using Oakland Bay sea water and pH was adjusted to 8.5 using 200 g/l caustic soda solution. A 50 ml graduate was then filled with the solution and 5 ml of Volclay KWK pellets were added slowly to the 50 ml of solution. After standing for 24 hours the volume of the clay pellets was recorded. In those samples in which a precipitate formed the volume of the precipitate was also recorded.

The dispersion test results are set forth in Tables II and V, the inhibition tests in Tables III and VI. The inhibition test results with neutralized lignosulfonate are shown in Table IV. In Table II, four separate series of tests were made, and each is grouped and compared with base mud in which no additive is present. In Table III, there were two series of tests and they are also grouped and separately compared with sea water in one series, and with fresh and sea water in the other series.

Table II

| Sample (Example No.) | Sea Water Dispersion Tests | | Gel Strengths | |
|---|---|---|---|---|
| | pH | Apparent Viscosity-Cp. | 10 Sec. | 10 Min. |
| Base Mud | 8.05 | 119 | 81 | 85 |
| K-Na Lignosulfonate (1) | 8.3 | 23.5 | 15 | 21 |
| 2% Iron Complex of K-Na Lignosulfonate (2) | 8.45 | 19 | 12 | 20 |
| K-Na Lignosulfonate autoclave cook (9) | 8.3 | 22.5 | 13 | 22 |
| K-Lignosulfonate autoclave cook (11) | 8.3 | 19.5 | 13 | 24 |
| Base Mud | 8.2 | 116.5 | 75 | 86 |
| K-Na Lignosulfonate (1) | 8.1 | 28.5 | 17 | 25 |
| Na-Lignosulfonate from soda base SSL (3) | 8.2 | 34 | 23 | 28 |
| K-Lignosulfonate from ammonia base SSL (12) | 8.25 | 31.5 | 19 | 32 |
| Na-Lignosulfonate from ammonia base SSL (14) | 8.25 | 36 | 25 | 29 |
| 2% Iron Complex of K-Na Lignosulfonate (2) | 8.4 | 26.5 | 14 | 23 |

Table II-continued

Sea Water Dispersion Tests

| Sample (Example No.) | pH | Apparent Viscosity-Cp. | Gel Strengths 10 Sec. | 10 Min. |
|---|---|---|---|---|
| Base Mud | 8.2 | 116.5 | 75 | 86 |
| 2% Iron Complex of Na-Lignosulfonate from ammonia base SSL (15) | 8.5 | 30 | 20 | 27 |
| 2% Iron Complex of Na-Lignosulfonate from soda base SSL (4) | 8.45 | 30.5 | 18 | 22 |
| 2% Iron Complex of K-Na Lignosulfonate (2) | 8.45 | 26 | 12 | 21 |
| 2% Iron Complex of K-Lignosulfonate from ammonia base SSL (13) | 8.45 | 31.5 | 23 | 27 |
| 2% Iron Complex of K-Na Lignosulfonate autoclave cook (10) | 8.35 | 34 | 17 | 31 |
| Base Mud | 8.2 | 116.5 | 75 | 86 |
| K-Lignosulfonate (16) | 8.2 | 27.5 | 17 | 20 |
| Na-Lignosulfonate (17) | 8.25 | 29.5 | 18 | 28 |

Table III

Inhibition Tests

| Sample (Example No.) | Clay Volume After 24 Hours |
|---|---|
| Sea Water | 14½ ml. |
| K-Na Lignosulfonate (1) | 10½ ml. |
| 2% Iron Complex of K-Na Lignosulfonate (2) | 11 ml. |
| K-Na Lignosulfonate, autoclave cook (9) | 10 ml. |
| K-Lignosulfonate, autoclave cook (11) | 10 ml. |
| Na-Lignosulfonate, from soda base SSL (3) | 12 ml. |
| K-Lignosulfonate, from ammona base SSL (12) | 11 ml. |
| Na-Lignosulfonate, from ammonia base SSL (14) | 12½ ml. |
| 2% Iron Complex of Na-Lignosulfonate, from ammonia base SSL (15) | 12 ml. |
| 2% Iron Complex of Na-Lignosulfonate, from soda base SSL (4) | 11½ ml. |
| 2% Iron Complex of K-Lignosulfonate, from ammonia base SSL (13) | 10½ ml. |
| 2% Iron Complex of K-Na Lignosulfonate, autoclave cook (10) | 11 ml. + ½ ml. ppt. |
| Fresh Water | 45.0 ml. |
| Sea Water | 14.5 ml. |
| K-Lignosulfonate (16) | 11.0 ml. |
| Na-Lignosulfonate (17) | 12.0 ml. |

Table IV

Inhibition Test

| Sample (Example No.) | Clay Volume After 24 Hours |
|---|---|
| K-Na Lignosulfonate (1) | 10½ ml. |
| 2% Iron Complex of K-Na Lignosulfonate (2) | 11 ml. |
| Soda base SSL neut. to pH 8 with KOH (5) | 12½ ml. |
| Soda base SSL neut. to pH 8 with NaOH (7) | 12 ml. |
| 2% Iron Complex of soda base SSL neut. to pH 8 with KOH (6) | 12 ml. + 2 ml. ppt. |
| 2% Iron Complex of soda base SSL neut. to pH 8 with NaOH (8) | 12½ ml. + 3 ml. ppt. |

Table V

Sea Water Dispersion Test

| Sample (Example No.) | pH | Apparent Viscosity-cp. | Gel Strengths 10 Sec. | 10 Min. |
|---|---|---|---|---|
| Base Mud | 7.7 | 79 | 62 | 69 |
| K-Na Lignosulfonate (1) | 8.0 | 29 | 15 | 26 |
| 2% Iron Complex of K-Na Lignosulfonate (2) | 8.3 | 26 | 12 | 22 |
| 2% Iron Complex of K-Na Lignosulfonate (18) | 8.0 | 29.5 | 17 | 33 |
| 2% Iron Complex of K-Na Lignosulfonate (20) | 8.1 | 32.5 | 21 | 26 |
| 2% Iron Complex of K-Na Lignosulfonate (2) | 8.6 | 18 | 8 | 14 |
| 2% Iron Complex of K-Na Lignosulfonate (19) | 8.55 | 23 | 12 | 19 |
| 2% Iron Complex of K-Na Lignosulfonate (21) | 8.5 | 20.5 | 11 | 17 |
| 2% Iron Complex of K-Na Lignosulfonate (18) | 8.5 | 24 | 15 | 20 |
| 2% Iron Complex of K-Na Lignosulfonate (20) | 8.45 | 27 | 17 | 23 |
| K-Na Lignosulfonate (1) | 8.4 | 17 | 8 | 12 |
| 2% Iron Complex of K-Na Lignosulfonate (2) | 8.5 | 14 | 5 | 9 |
| 2% Iron Complex of K-Na Lignosulfonate (22) | 8.5 | 16 | 7 | 11 |
| 3% Iron Complex of K-Na Lignosulfonate (23) | 8.6 | 12.5 | 4 | 9 |

Table VI

Inhibition Tests

| Sample (Example No.) | Clay Volume After 24 Hours |
|---|---|
| Sea Water | 14½ ml. |
| K-Na Lignosulfonate (1) | 10½ ml. |
| 2% Iron Complex of K-Na Lignosulfonate (2) | 11 |
| K-Na Lignosulfonate (18) | 10½ ml. |

Table VI-continued

| Sample (Example No.) | Inhibition Tests Clay Volume After 24 Hours |
|---|---|
| K-Na Lignosulfonate (20) | 10½ ml. |
| 2% Iron Complex of K-Na Lignosulfonate (19) | 10½ ml. + very slight ppt. |
| 2% Iron Complex of K-Na Lignosulfonate (21) | 10½ ml. + very slight ppt. |
| K-Na Lignosulfonate (22) | 10½ ml. |
| 3% Iron Complex of K-Na Lignosulfonate (23) | 10½ ml. + very slight ppt. |

Table II demonstrates that the potassium (and potassium-sodium) lignosulfonates were at least as effective as sodium lignosulfonate in their ability to disperse sea muds. This Table also shows that the best dispersion results (see the first two series of tests) were achieved with the iron complexes of potassium lignosulfonates. Table III demonstrates that the potassium lignosulfonates of the invention are consistently superior to sodium lignosulfonates in their swelling inhibition capability. The best result with sodium was 11½ ml. with 2% iron complex vs. a range with potassium of 10 to 11 ml. It should be noted that what appears to be a relatively small difference in swelling volume proves to be a very significant difference in actual use. Table IV shows that neutralization of SSL with potassium or sodium hydroxide is not the equivalent of digestion. Note also the significant amount of precipitate with the neutralized iron complexes — some 4 to 6 times more than that obtained with one of the iron complexes of a digested sample of K-Na lignosulfonate in Table IV. Tables V and VI list additional dispersion and inhibition test results for the products set forth in the Examples.

We claim:

1. A process for drilling a well through shale formation in sea water comprising
   drilling through said shale while circulating in the well an aqueous drilling mud comprising a clay-sea water slurry containing an iron complex of a mixture of a potassium salt of lignosulfonate and from 5–15% by weight of hydroxy acid salts, said mixture being prepared by reacting sodium or ammonium base spent sulfite liquor including reducing sugars and from 5 to 25%, based on the solids content of the spent sulfite liquor, of potassium hydroxide, said reaction being carried out at a temperature of from 50° to 175° C to produce a reaction product having a final pH no less than 10, said iron complex being prepared by adding a ferric salt to said reaction product whereby from ½ to 4% of the final product, based on total solids, of a ferric complex of said hydroxy acid salts is formed.

2. An aqueous drilling mud composition for shale formations in sea water comprising a clay-sea water slurry containing an iron complex of a mixture of a potassium salt of lignosulfonate and from 5–15% by weight of hydroxy acid salts, said mixture prepared by reacting sodium or ammonium base spent sulfite liquor including reducing sugars and from 5% to 25%, based on the solids content of the spent sulfite liquor, of potassium hydroxide, said reaction being carried out at a temperature of from 50° to 175° C to produce a reaction product having a final pH no less than 10, said iron complex being prepared by adding a ferric salt to said reaction product whereby from ½ to 4%, based on total solids, of a ferric complex of said hydroxy acid salts is formed.

* * * * *